United States Patent [19]

Tomita

[11] Patent Number: 5,577,840

[45] Date of Patent: Nov. 26, 1996

[54] METHOD OF MEASURING TEMPERATURE BY USE OF AN INFRARED SENSOR

[75] Inventor: Katsuhiko Tomita, Miyanohigashi-machi, Japan

[73] Assignee: Horiba, Ltd., Kyoto, Japan

[21] Appl. No.: 242,320

[22] Filed: May 13, 1994

[30] Foreign Application Priority Data

May 15, 1993 [JP] Japan .................... 5-030514 U
May 29, 1993 [JP] Japan ....................... 5-151570

[51] Int. Cl.$^6$ .................................................. G01J 5/08
[52] U.S. Cl. ............................................................ 374/130
[58] Field of Search .................................. 374/129, 130, 374/133, 128, 103, 115, 116; 128/736, 664

[56] References Cited

U.S. PATENT DOCUMENTS

| | | | |
|---|---|---|---|
| 3,935,460 | 1/1976 | Flint | 374/124 |
| 4,702,618 | 10/1987 | Maund | 374/103 |
| 4,955,727 | 9/1990 | Weiss | 374/124 |
| 5,115,815 | 5/1992 | Hansen | 374/121 |
| 5,314,248 | 5/1994 | Manassero et al. | 374/124 |

FOREIGN PATENT DOCUMENTS 0462661  6/1975  U.S.S.R. ............................ 374/130

OTHER PUBLICATIONS

"Computer Speeds Up Pyrometer Response," National Bureau of Standards, Instrumentation Technology, vol. 17, No. 11 (Nov. 1970).

*Primary Examiner*—Diego F. F. Gutierrez
*Attorney, Agent, or Firm*—Poms, Smith, Lande & Rose

[57] ABSTRACT

A method of measuring temperature by the use of an infrared sensor is capable of measuring temperature with high accuracy without being influenced by thermal drifts due to conditions of the atmosphere and environment before the start of measurement. An infrared sensor is associated with a normally closed shutter. The shutter includes a plurality of openings, such that one starting signal provided to the shutter produces a plurality of output signals from the infrared sensor 6 by a single reciprocating motion of the shutter. The first signal is excluded or averaged with the subsequent signals in calculating temperature.

8 Claims, 4 Drawing Sheets

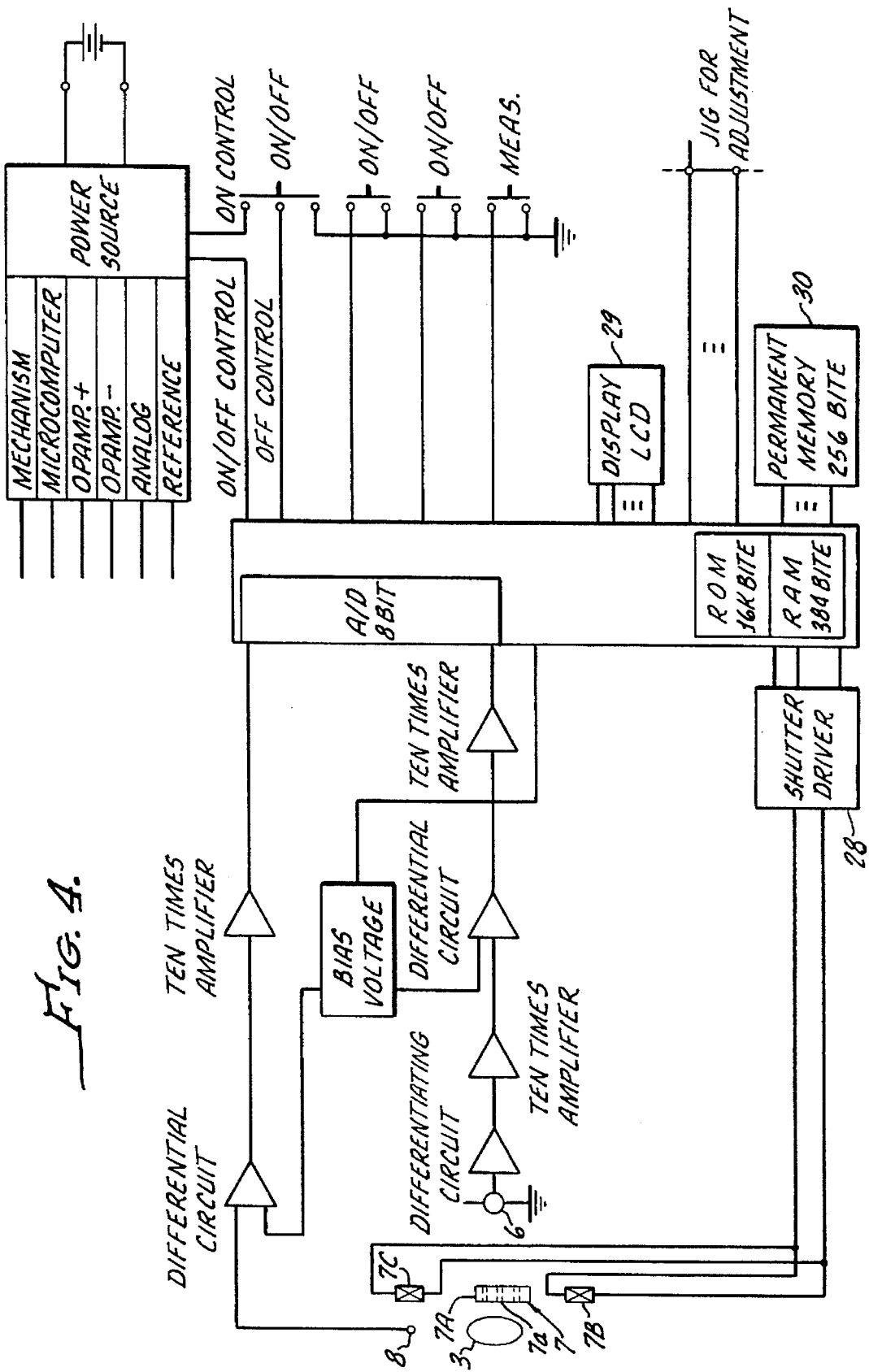

METHOD OF MEASURING TEMPERATURE BY USE OF AN INFRARED SENSOR

BACKGROUND OF THE INVENTION

1. Field of the Invention

The present invention relates to a method of accurately measuring the temperature of an object on the basis of infrared rays incident upon an infrared sensor positioned behind a normally closed shutter.

2. Description of the Prior Art

A conventional method of measuring temperature is disclosed in, for example, Japanese Patent Application Publication No. Sho 62-503,119. In this method, a shutter is provided on a front side of an infrared sensor provided in a body case of a clinical thermometer with the condition that the shutter is always closed. To display a temperature, one output signal is obtained from the infrared sensor when the shutter is opened and closed by switching on a power source button and measuring a quantity of infrared rays from the output signal.

Although the above-described conventional method of measuring a temperature is remarkably simple in operation, the following disadvantages occur. As soon as the power source button is switched on, the infrared rays are incident upon the infrared sensor so that a peak of the signal output from the infrared sensor is unstable. Because the shutter is closed before the start of measurement, the sensing portion of the infrared sensor is under an equilibrium condition at a temperature within the body case. Thus, when the infrared rays are suddenly incident upon the sensing portion, the thermal-type infrared sensor is influenced by the room temperature as well as by the quantity of infrared rays. As a result, the first signal due to the infrared rays incident upon the sensor immediately after the shutter is opened is unstable relative to a second signal and signals thereafter. Consequently, it is difficult to measure temperature with high accuracy, for example, within ±0.01° C. to 0.1° C., with this conventional method of measuring a temperature.

SUMMARY OF INVENTION

The present invention has been achieved by taking the above-described matters into consideration. It is an object of the present invention to provide a method of measuring a temperature with high accuracy without being influenced by thermal drifts due to atmospheric and environmental factors before the start of measurement and the like.

In order to achieve the above-described object, the present invention provides a method of measuring temperature by measuring temperature of an object on the basis of infrared rays incident upon an infrared sensor when a normally closed shutter provided on the front side of the infrared sensor is opened according to the present invention.

According to one embodiment, the shutter is provided with a plurality of openings. A starting signal is given to the shutter. The first of a plurality of output signals from the infrared sensor, which output signals are obtained by a single reciprocating motion of the shutter, is excluded from analysis, and the output signals obtained thereafter are used to compute temperature.

Alternatively, the following method may be used. The shutter is provided with only one opening. A starting signal is given to the shutter. The first signal of a plurality of output signals from the infrared sensor, which output signals are obtained by the reciprocating motion of the shutter, is excluded, and the output signals obtained thereafter are used to calculate temperature.

In the embodiment where, for example, the shutter has a plurality of openings, a plurality of signals are output from the infrared sensor by a single reciprocating motion of the shutter when the shutter receives a starting signal. In this embodiment, as described above, the first signal due to infrared rays incident upon the sensor immediately after the shutter is opened is unstable relative to second signal and subsequent signals. Therefore, this first signal is ignored.

According to the present invention, influences by thermal drifts due to atmospheric and environmental conditions before the start of measurement and the like can be eliminated by either (1) using signals only after the first-signal or (2) using a plurality of signals (including the first signal) different from the use of only the first signal. In addition, operation by providing only one starting signal is sufficient, so that operations required for a measurement are as simple as in conventional methods. In short, the first signal is excluded, and the signals thereafter are used in calculating temperature according to the present invention.

Furthermore, in the case where a shutter having a plurality of openings is used, a plurality of signals are output from the infrared sensor by a single reciprocating motion of the shutter. As a result, the measurement of temperature can be conducted with high accuracy, while suppressing impact noise and vibration generated during the reciprocating motion of the shutter. Measurements are not influenced by thermal drifts due to atmospheric and environmental factors before the start of measurement.

BRIEF DESCRIPTION OF THE DRAWINGS

FIG. 4 is a block diagram showing the construction of an exemplary apparatus for measuring temperature;

DETAILED DESCRIPTION OF THE EMBODIMENTS

The embodiments of the present invention will be described below with reference to the drawings.

Figure 1:
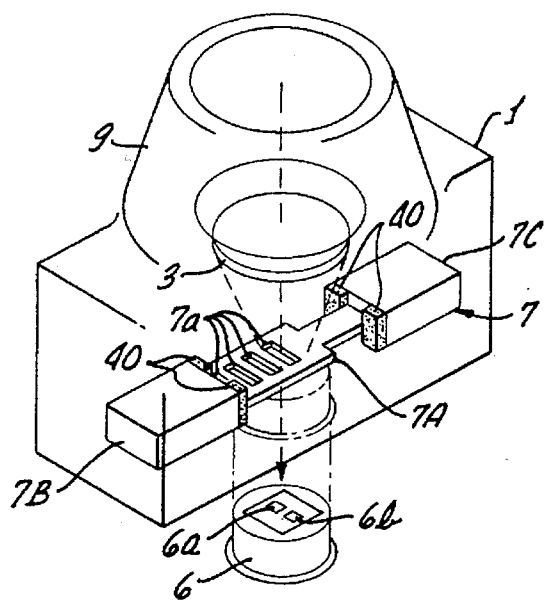
FIG. 1 is a perspective view showing one embodiment of an apparatus for measuring a temperature in a method according to the present invention.
Figure 2:
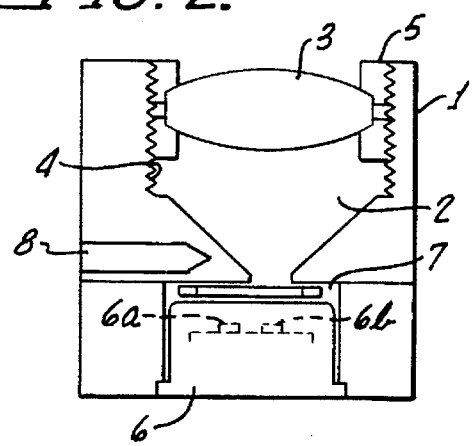
FIG. 2 is a longitudinal sectional view showing the apparatus of FIG. 1.
Figure 3:
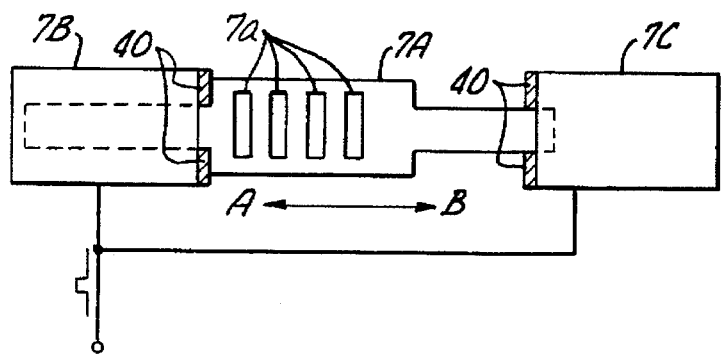
FIG. 3 is a plan view showing an exemplary construction of a shutter in the apparatus for measuring temperature.

FIGS. 1 to 3 show one embodiment of an apparatus for measuring a temperature used in a method of measuring a temperature according to the present invention. Referring to FIG. 1 and FIG. 2, reference numeral 1 designates a hollow portion opened on the front side (an upper side in the embodiment shown) of body case 1. A collecting lens 3 is detachably provided on the front side of the body case 1 so as to close the hollow portion 2. The collecting lens 3 is held in place by a holding member 5 screwed in a screw portion 4 formed on a side wall surrounding the hollow portion 2.

An infrared sensor 6 is provided below the hollow portion 2 and consists of, for example, a dual-type pyrosensor. Thus, two light-receiving surfaces 6a, 6b of the infrared sensor 6 are disposed opposite to the lens 3. A shutter 7 is provided between the lens 3 and the sensor 6. A temperature-compensating thermistor 8 is provided in the vicinity of the shutter 7 and the infrared sensor 6, and a cover member 9 is provided for protecting an outer surface of the lens 3.

The shutter 7, which is normally closed, is provided with a movable portion that linearly reciprocates when a starting signal is provided. An exemplary electromagnetic wave-intermitting device or shutter is disclosed in a Japanese patent application filed by the present applicant on Jun. 25, 1992 (Japanese Patent Application No. Hei 4-193,127).

Figure 7:
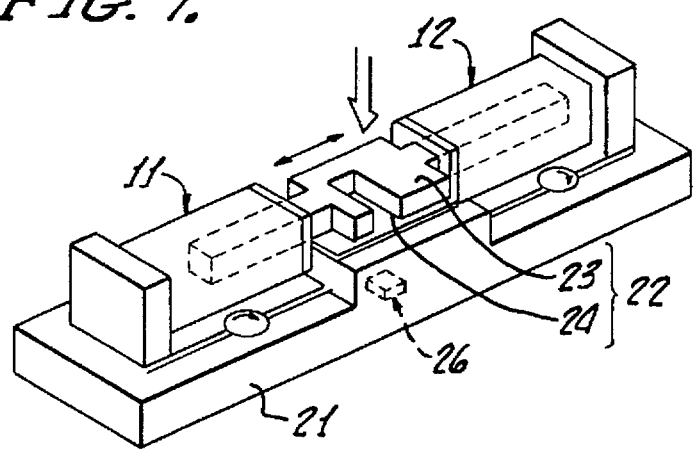
FIG. 7 is a perspective view showing an alternative construction of an electro-magnetic wave intermitting device as the base of the apparatus for measuring temperature.
Figure 8:
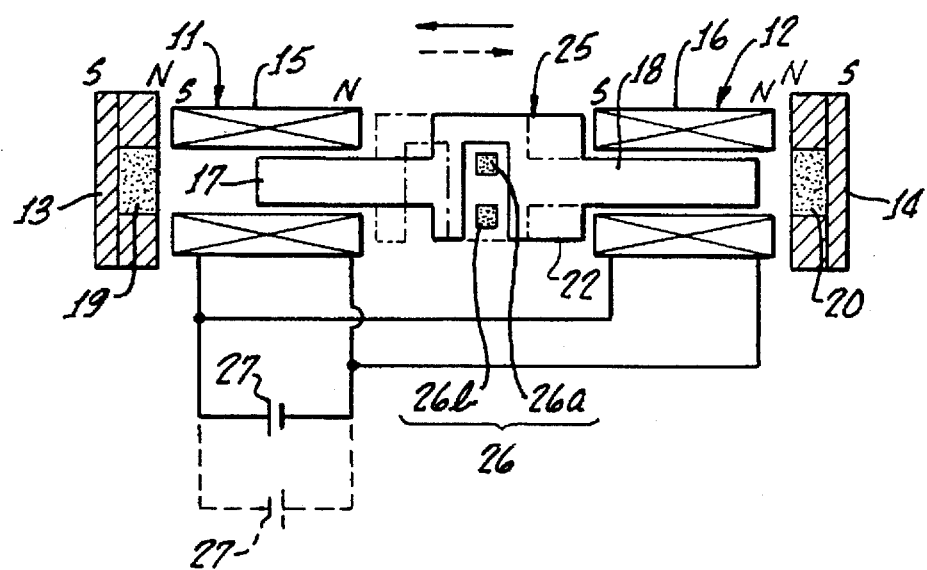
FIG. 8 is a sectional view of the electro-magnetic wave intermitting device.

FIG. 7 and FIG. 8 show a construction of a basic double solenoid-type electro-magnetic wave-intermitting device according to the above-mentioned patent application. Referring to FIGS. 7 and 8, reference numerals 11 and 12 each designates a self-holding solenoid respectively comprising fixed iron cores 13 and 14, coils 15 and 16 wound in the same direction, movable iron cores 17 and 18, and permanent magnets 19 and 20. The self-holding solenoids 11, 12 are arranged on a straight line.

In this exemplary embodiment, the permanent magnets 19, 20 are arranged so that magnetic poles may be opposite to each other in polarity. For example, in self-holding solenoid 11, the N-pole is arranged closer to movable iron core 17, while in self-holding solenoid 12, the S-pole is arranged closer to movable iron core 18. A base frame 12 is provided for holding the self-holding solenoids 11, 12 in the appointed positional relationship.

A covering portion 22 is provided between the self-holding solenoids 11, 12. The covering portion 22 is held by connecting with the movable iron cores 17, 18 and is made of a material which shields electro-magnetic waves (such as light). For example, plastic, iron, aluminum, stainless steel, and lead (effective for X-rays and the like) may form the covering portion 22 which is provided with an opening 24 as a part thereof. In short, the movable iron cores 17, 18 and the covering portion 22 form a movable member 25, as shown in FIG. 8. In addition, reference numeral 26 designates a dual-type pyrosensor consisting of, for example, two light-receiving elements 26a and 26b.

In the electro-magnetic wave-intermitting device 10 having the construction described above, when the coils 15, 16 of the self-holding solenoids 11, 12 are connected with each other in parallel to provide a direct-pulse signal (i.e., a one-shot signal) to the coils 15, 16, magnetic fields of the same direction are generated in the self-holding solenoids 11, 12.

In FIG. 8, under a light-receiving condition where the various elements are positioned as shown by a solid line, light arrives at the detector 26. Thus, when the coils 15, 16 are connected with a DC power source 27 as shown by a solid line, a force drawing movable iron core 17 toward the side of permanent magnet 19 acts in self-holding solenoid 11, and a force repelling movable iron core 18 from the side of permanent magnet 20 acts in self-holding solenoid 12 to move the movable member 25 in the direction of the arrow shown by a solid line, thereby moving the covering portion 22 in the same direction. Accordingly, the detector 26 is placed in a closed or shaded condition in contrast to the light-receiving condition. Movable iron core 17 is drawn by permanent magnet 19 to maintain the shaded condition in self-holding solenoid 11.

On the other hand, under the shaded condition where the movable iron cores 17, 18 are positioned as shown by phantom line and the detector 26 is shaded, when the coils 15, 16 are connected with the DC power source 27 as shown by phantom line, forces opposite to the above-described forces act in the self-holding solenoids 11, 12. Accordingly, the movable member 25 moves in the direction of the arrow shown by phantom line, thereby moving the covering portion 22 in the same direction. Accordingly, the detector 26 is placed in the light-receiving condition from the shaded condition. Movable iron core 18 is drawn by permanent magnet 20 to maintain the light-receiving condition in self-holding solenoid 12.

As described above, the movable member 25 consisting of the movable iron cores 17, 18 and the covering portion 22 can be moved by sending control signals of the same polarity in the coils 15, 16, so that the detector 26 can be placed in the shaded condition from the light-receiving condition, and vice versa. And, if pulse-like control signals different in polarity are alternately provided to the coils 15, 16, a shutter, chopper or the like is effected.

Alteratively, according to the device for measuring temperature used in a method according to the present invention, the electro-magnetic wave-intermitting device operated according to above-described operating principle is further provided with a shutter 7 as shown in FIGS. 1 and 3. Referring to FIGS. 1 and 3, reference numeral 7A designates a shutter body corresponding to the movable member 25 in FIGS. 7 and 8. In addition, reference numerals 7B and 7C designate self-holding solenoids provided at both ends of the shutter body 7A. The shutter body 7A is provided with a plurality of openings 7a formed at or near the center thereof.

In the above-described shutter 7, when the self-holding solenoids 7B, 7C draw the shutter body 7A, the shutter body 7A is engaged with the self-holding solenoids 7B, 7C to be stopped and held in that condition. Because the shutter body 7A moves at a remarkably high speed, considerably increased impact noises and vibrations are generated when the shutter body 7A is engaged with the self-holding solenoids 7B, 7C. However, a plurality of signals may be output from the infrared sensor 6 by reciprocating the shutter body 7A only one time as the shutter body 7A is provided with a plurality of openings 7a. Thus, noises and vibrations generated during the operation of the electro-magnetic wave-intermitting device can be reduced.

For example, an abrasion resistant impact-relaxing material 40 is applied to the surfaces facing the shutter body 7A of the self-holding solenoids 7B, 7C with suitable adhesives. Materials having a suitable friction factor and abrasive resistance, such as artificial leather and, in particular, grinding cloth for use in the mirror-finishing of semiconductor substrates (for example, suede-type and belloa-type grinding cloth manufactured by Daiichi Race Co., Ltd.) are preferably used as the impact-relaxing material 40.

In the embodiment shown, impact-relaxing material 40 is also applied to the surfaces facing the self-holding solenoids 7B, 7C. Therefore, even though the shutter body 7A linearly moves in the direction of arrow A or arrow B, the shutter 7A is not brought into direct contact with the self-holding solenoids 7B, 7C but is brought into contact with the impact-relaxing material 40. Thus, even though the shutter body 7A itself is brought into collision with the self-holding solenoids 7B, 7C at a high speed, the impact is relaxed or absorbed by means of the impact-relaxing material 40, and the noise and vibration generated by the collision are further reduced.

Moreover, although the impact-relaxing material 40 is provided on the surfaces facing the shutter body 7A of the self-holding solenoids 7B, 7C in the above-described preferred embodiment, the impact-relaxing material 40 may be provided on the surfaces of the shutter body 7A facing the self-holding solenoids 7B, 7C.

FIG. 4 is a block diagram showing a relationship among the infrared sensor 6, the shutter 7, a shutter driver 28 for driving the shutter 7, a circuit for operating outputs of the infrared sensor 6 and the thermistor 8, a power source circuit, and the other apparatus provided in the above-described device for measuring temperature.

Figure 5A:
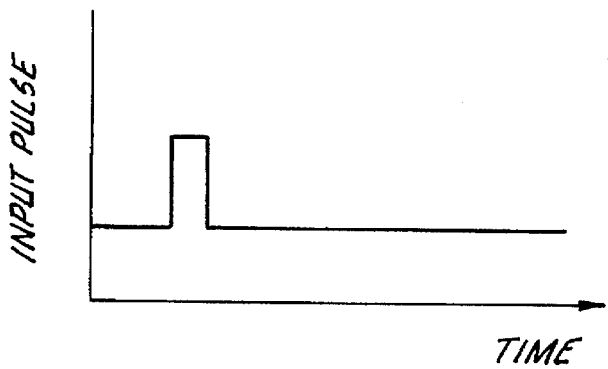
FIGS. 5(A) and 5(B) are exemplary output signals of the present invention.
Figure 5B:
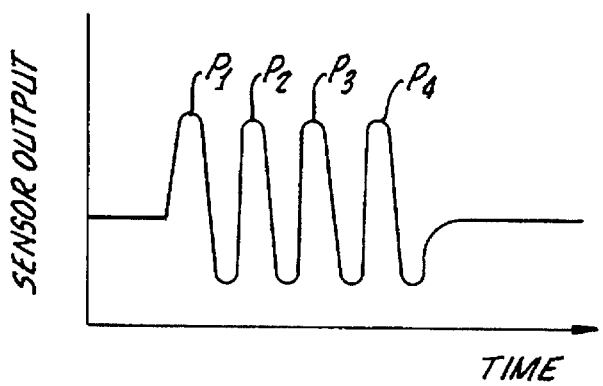

In the device for measuring temperature having the above-described construction, upon switching on the power source, only one pulse signal as shown in FIG. 3 and FIG. 5(A) is output from the shutter driver 28 to be provided the self-holding solenoids 7B, 7C, thereby linearly reciprocating shutter body 7A one time, as shown in FIG. 3, and outputting four signals having peaks P1 to P4 as shown in FIG. 5(B) from the infrared sensor 6. Of these output signals, first peak P1 is influenced by thermal drift due to atmospheric and environmental factors present before the start of measurement, and may contain an error. Thus, the first peak P1 is excluded, and the operation is conducted on the basis of the remaining signals including peaks P2 to P4. For example, the temperature of the object to be measured is obtained by averaging the second peak signal P2 and the third peak signal P3. The results of the measurement are not only displayed in a display 29 formed of a liquid crystal as shown in FIG. 4 but are also suitably stored in a memory 30.

Although the signal including the first peak P1 is excluded and the operation is conducted on the basis of the signals thereafter in the above-described preferred embodiment, the operation may be conducted on the basis of an average value of a plurality of signals including the first signal.

In the case where the output signals of the infrared sensor 6 extend over two or more ranges in size, those data are abandoned to conduct the measurement once more. Furthermore, wave forms of the signals, such as intervals between a plurality of signals, output from infrared sensor 6 can be optionally regulated by suitably setting circuit constants as known in the art.

Figure 6:
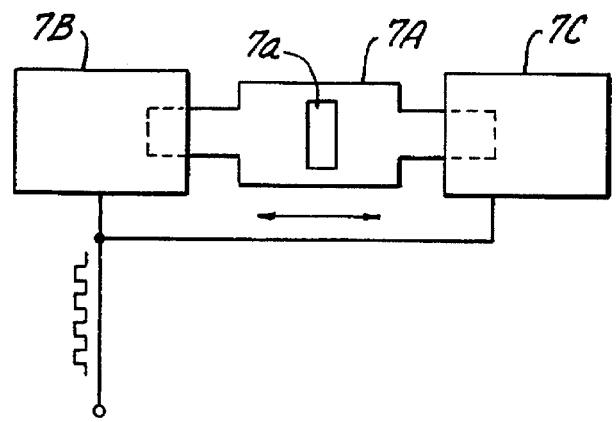
FIG. 6 is a plan view showing the construction of a shutter in another embodiment of the present invention.

The present invention is not limited by the above-described preferred embodiment. As shown in, for example, FIG. 6, the shutter body 7A may be provided with only one opening 7a substantially at the center thereof. A plurality of pulse signals as also shown in FIG. 6 are provided the self-holding solenoids 7B, 7C. In this case, a plurality of pulse signals are provided the self-holding solenoids 7B, 7C by operating the apparatus only one time.

Furthermore, the shutter 7 may include, for example, a microactuator or a movable piece-type actuator that is linearly reciprocated, which can be used to produce an intermitting incidence of infrared rays upon the infrared sensor 6.

As described above, according to the present invention temperature can be measured with high accuracy, for example within ±0.01° C. to 0.1° C., without being influenced by thermal drift due to atmospheric and environmental conditions before the start of measurement; thus, the present invention can be widely applied to clinical thermometers and normal thermometers.

Moreover, in the case where the shutter is provided with a plurality of openings, a plurality of signals are output from the infrared sensor by a single reciprocation so that the temperature can be measured with high accuracy without being influenced by thermal drift due to atmospheric and environmental conditions before the start of measurement, while, at the same time, preventing impact noises and vibrations generated during the reciprocation of shutter.

What is claimed is:

1. A method of measuring the temperature of an object on the basis of infrared rays incident upon an infrared sensor when a normally closed shutter provided on a front side of the infrared sensor is opened, the shutter having a plurality of openings, the method comprising the steps of:

providing a starting signal to the shutter;

excluding a first signal of a plurality of output signals from the infrared sensor obtained by a single reciprocating motion of the shutter; and using signals after the first signal to calculate temperature.

2. A method of measuring the temperature of an object on the basis of infrared rays incident upon an infrared sensor when a normally closed shutter provided on a front side of the infrared sensor is opened, the shutter having a single opening, the method comprising the steps of:

providing a starting signal to the shutter;

excluding a first signal of a plurality of output signals from the infrared sensor obtained by a plurality of reciprocating options of the shutter; and using signals after the first signal to calculate temperature.

3. A method of measuring the temperature of an object on the basis of infrared rays incident upon an infrared sensor, said method comprising the steps of:

providing a normally closed, linearly reciprocating shutter including at least one opening in front of said infrared sensor to prevent infrared rays from said object to be measured from reaching said infrared sensor;

reciprocating said shutter to position said at least one opening in front of said infrared sensor to allow said infrared rays to be incident upon said infrared sensor to generate a plurality of output signals from said infrared sensor; and calculating the temperature of said object as an average value based upon said plurality of output signals by excluding the influence of the first signal of said plurality of output signals.

4. The method of claim 3 further comprising the additional step of displaying said calculated temperature.

5. The method of claim 3 further comprising the additional step of storing said calculated temperature in a memory.

6. The method of claim 3 wherein said normally closed, linearly reciprocating shutter is provided with a plurality of openings and said reciprocating step comprises a single linear movement of said shutter sequentially passing each of said plurality of openings in front of said infrared sensor to generate said plurality of output signals.

7. The method of claim 3 wherein said shutter is provided with a single opening and said reciprocating step comprises a plurality of linear movements of said shutter repeatedly passing said opening in front of said infrared sensor to generate said plurality of output signals.

8. The method of claim 3 wherein said calculating step excludes the influence of said first signal of said plurality of output signals by averaging the value of the second and subsequent signals of said plurality of output signals.

\* \* \* \* \*